(12) United States Patent
Ramamoorthy et al.

(10) Patent No.: US 8,068,306 B2
(45) Date of Patent: Nov. 29, 2011

(54) WRITE QUALITY OF HDD HEADS EXPERIENCING TEMPORARY FLY-HEIGHT PROBLEMS

(75) Inventors: Lakshmi Ramamoorthy, San Jose, CA (US); David Jen, San Jose, CA (US); Douglas Zuercher, Morgan Hill, CA (US); Masayoshi Shimokoshi, Kanagawa (JP); Kris Schouterden, San Jose, CA (US)

(73) Assignee: Hitachi Global Storage Technologies Netherlands B.V. (NL)

( * ) Notice: Subject to any disclaimer, the term of this patent is extended or adjusted under 35 U.S.C. 154(b) by 16 days.

(21) Appl. No.: 12/637,408

(22) Filed: Dec. 14, 2009

(65) Prior Publication Data
US 2011/0141607 A1    Jun. 16, 2011

(51) Int. Cl.
*G11B 21/02* (2006.01)
*G11B 15/04* (2006.01)
(52) U.S. Cl. ............................. 360/75; 360/60
(58) Field of Classification Search .................. None
See application file for complete search history.

(56) References Cited

U.S. PATENT DOCUMENTS

| | | | |
|---|---|---|---|
| 5,831,781 A | 11/1998 | Okamura | |
| 5,991,113 A | 11/1999 | Meyer et al. | |
| 6,501,606 B2 | 12/2002 | Boutaghou et al. | |
| 6,853,508 B2 * | 2/2005 | Smith et al. | 360/31 |
| 7,095,578 B2 * | 8/2006 | Ma | 360/75 |
| 7,362,533 B2 * | 4/2008 | Stipe | 360/75 |
| 7,375,914 B1 | 5/2008 | Dieron et al. | |
| 7,400,473 B1 | 7/2008 | Krajnovich et al. | |
| 7,430,090 B2 | 9/2008 | Oyamada et al. | |
| 7,502,205 B1 | 3/2009 | Hurtado et al. | |
| 7,609,473 B1 * | 10/2009 | Mate | 360/75 |
| 7,724,463 B2 * | 5/2010 | Nakamura et al. | 360/75 |
| 7,808,738 B2 * | 10/2010 | Mitsunaga et al. | 360/75 |

FOREIGN PATENT DOCUMENTS

JP        2008210499        11/2008

OTHER PUBLICATIONS

Masayuki Kurita et al., "Flying-height reduction of magnetic-head slider due to thermal protrusion," IEEE Transactions on Magnetics, vol. 41, No. 10, Oct. 2005, available online at http://ieeexplore.ieee.org/xpls/abs_all.jsp?arnumber=1519189&isnumber=32516, printed Jun. 29, 2009.

B. Liu et al., "Low Flying-Height Slider with High Thermal Actuation Efficiency and Small Flying-Height Modulation Caused by Disk Waviness," IEEE Transactions on Magnetics, vol. 44, No. 1, Jan. 2008, available online at http://ieeexplore.ieee.org/xpls/abs_all.jsp?arnumber=1519189&isnumber=32516.

* cited by examiner

*Primary Examiner* — K. Wong
(74) *Attorney, Agent, or Firm* — Mahamedi Paradice Kreisman LLP; Christopher J. Brokaw

(57) ABSTRACT

Approaches for improving the write quality of a hard-disk drive (HDD) head experiencing temporary fly-height problem. When the hard-disk drive is idle and heads are parked on the ramp, fluid, such as a lubricant or the condensation of vapor, may collect between the surface of a platter and the head or a slider, thereby causing the head to temporarily fly higher than normal. An HDD may include electronic component(s) configured to (a) determine whether it is likely that fluid is interposed between the surface of a magnetic-recording disk and the slider or the head, and (b) temporarily adjust one or more of (i) a thermal fly height control setting of the head and (ii) a write parameter of the head to compensate for the head flying higher than normal as a result of the fluid being interposed between the surface of the disk and the slider or the head.

19 Claims, 5 Drawing Sheets

WRITE QUALITY OF HDD HEADS EXPERIENCING TEMPORARY FLY-HEIGHT PROBLEMS

FIELD OF THE INVENTION

Embodiments of the invention generally relate to improving the write quality of a hard-disk drive (HDD) head experiencing a temporary problem.

BACKGROUND OF THE INVENTION

A hard-disk drive (HDD) is a non-volatile storage device that is housed in a protective enclosure and stores digitally encoded data on one or more circular disks having magnetic surfaces (a disk may also be referred to as a platter). When an HDD is in operation, each magnetic-recording disk is rapidly rotated by a spindle system. Data is read from and written to a magnetic-recording disk using a read/write head which is positioned over a specific location of a disk by an actuator.

A read/write head uses a magnetic field to read data from and write data to the surface of a magnetic-recording disk. As a magnetic dipole field decreases rapidly with distance from a magnetic pole, the distance between a read/write head and the surface of a magnetic-recording disk must be tightly controlled. To provide a uniform distance between a read/write head and the surface of a magnetic-recording disk, an actuator relies on air pressure inside the hard drive enclosure to support the read/write heads at the proper distance away from the surface of the magnetic-recording disk while the magnetic-recording disk rotates. A read/write head therefore is said to "fly" over the surface of the magnetic-recording disk. That is, the air pulled along by a spinning magnetic-recording disk forces the head away from the surface of the magnetic-recording disk. When the magnetic-recording disk stops spinning, a read/write head must either "land" or be pulled away.

It is desirable, for a variety of reasons, to maintain a constant or approximately constant distance between the read/write head and the surface of the magnetic-recording disk to ensure proper operation of the read/write head. If the distance between a read/write head and the surface of a magnetic-recording disk fluctuates, then the strength of the magnetic dipole field between the read/write head and the surface of the magnetic-recording disk will also fluctuate, which may cause problems in reading data from or writing data to the magnetic-recording disk.

SUMMARY OF THE INVENTION

It is observed that when a magnetic read/write head of a hard-disk drive (HDD) is idle (such as when the magnetic read/write head is parked on a ramp) for a prolonged period of time, lubricant used on moving parts of the HDD may flow from the back of a slider and into a space between the magnetic read/write head and the surface of the magnetic recording disk. The lubricant interposed in this space provides a certain amount of support to the magnetic read/write head and causes the magnetic read/write head to temporarily fly higher than normal. This problem will correct itself over time as the magnetic recording disk rotates and the lubricant disperses. However, until the problem does correct itself, the temporary increase in the fly height of the magnetic read/write head interferes with the ability of the magnetic read/write head to read data from and write data to the magnetic recording disk.

Approaches are discussed herein for improving the write quality of a hard-disk drive (HDD) head experiencing temporary fly-height problem. An HDD may compromise one or more electronic components that are configured to (a) determine whether it is likely that a fluid is interposed between the surface of the magnetic-recording disk and the air bearing surface of the magnetic read/write head or slider, and (b) temporarily adjust one or more of (i) a thermal fly height control setting of the magnetic read/write head and (ii) a write parameter of the magnetic read/write head. In this way, one or more electronic components are able to compensate for the magnetic-read/write head flying higher than normal as a result of the fluid being interposed between the surface of the disk and the slider or the magnetic read/write head by either making a temporary adjustment to the fly height of the magnetic read/write head or temporarily adjusting characteristics of the magnetic field produced by the magnetic read/write head.

Embodiments discussed in the Summary of the Invention section are not meant to suggest, describe, or teach all the embodiments discussed herein. Thus, embodiments of the invention may contain additional or different features than those discussed in this section.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for improving the write quality of a hard-disk drive (HDD) head experiencing a temporary problem are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Temporary Fly Height Control Problem

When a magnetic read/write head of a hard-disk drive (HDD) is idle (such as when the magnetic read/write head is parked on a ramp) for a prolonged period of time, a fluid, such as a lubricant used on moving parts of the HDD, may flow into and/or collect in the space between the magnetic read/write head (or a part attached thereto, such as a slider) and the surface of the magnetic recording disk. For example, when the head is parked on a ramp, lubricant may flow towards the head and may ultimately collect underneath an exposed portion of the air-bearing surface of the slider. The fluid interposed in this space provides a certain amount of support to the head. The fluid pushes up against the head and/or slider and causes the head to temporarily fly higher than normal. When the head flies higher than normal, the head will perform "weak" write operations which result in an unacceptable number of errors when the written data is read back. This problem shall be referred to herein as the temporary fly height problem. The temporary fly height problem will correct itself over time as the magnetic recording disk rotates and the fluid disperses. However, until the temporary fly height problem does correct itself, the temporary increase in the fly height of the head interferes with the ability of the head to read data from and write data to the magnetic recording disk.

The temporary fly height problem may be caused by any type of fluid interposed between the magnetic read/write head (or a part attached thereto, such as a slider) and the surface of the magnetic-recording disk. For example, the condensation of vapor present within the interior of the hard-disk drive may also cause a temporary increase in the fly height of the magnetic read/write head if the condensation is present between the magnetic read/write head (or a part attached thereto, such as a slider) and the surface of the magnetic-recording disk. Such condensation may be dew or a mixture of water and contaminants, such as chemicals or particles, which were previously airborne.

Figure 1:
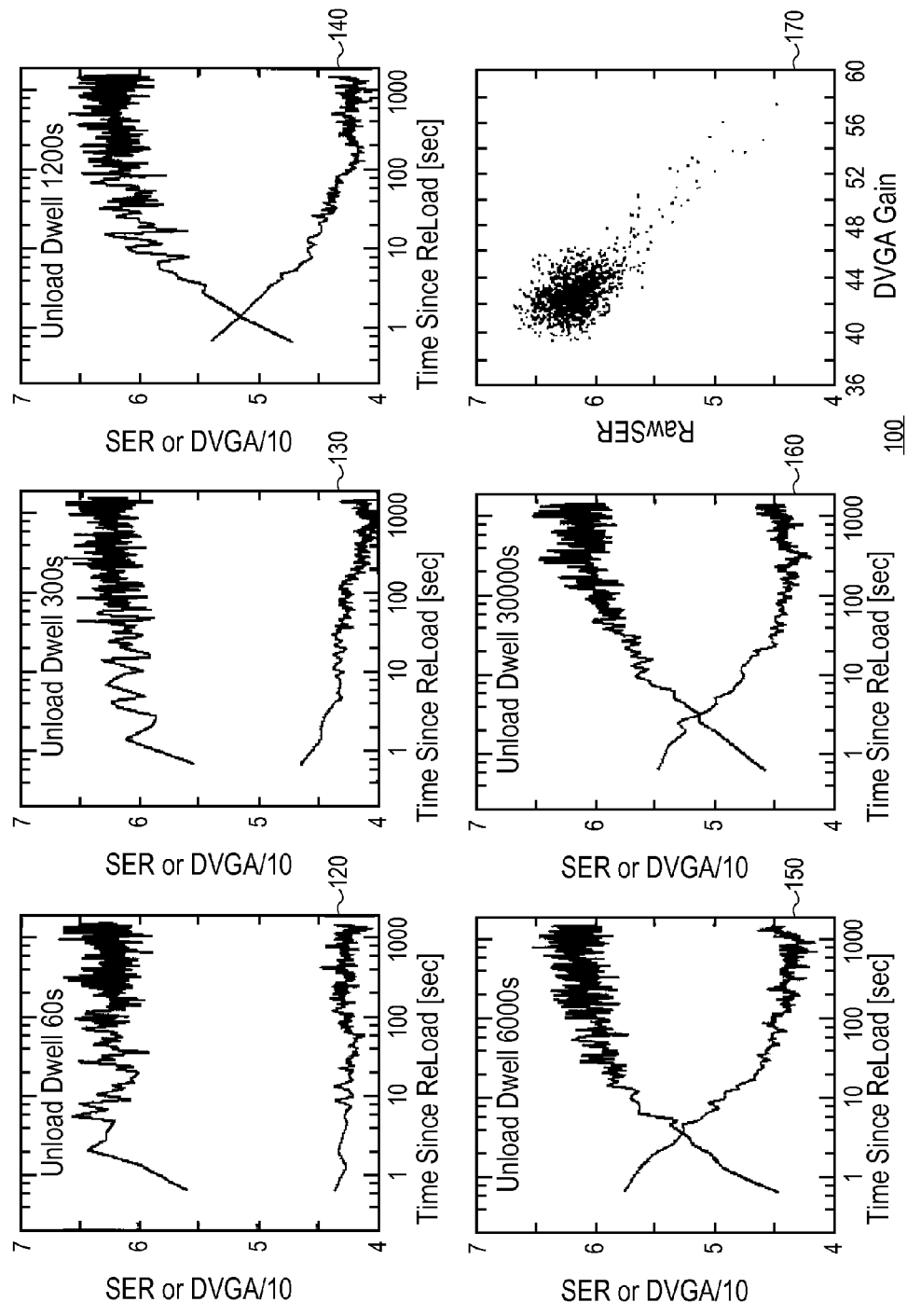
FIG. 1 is an illustration of six graphs that show the correlation between the error rate in reading/writing data and the time the magnetic read/write head is idle.

FIG. 1 is an illustration 100 of six graphs that depict the correlation between the error rate in reading/writing data and the time the magnetic read/write head is idle. Graphs 120-160 show the correlation between different lengths of time in which an HDD head is idle and the error rate of the head after it begins to write data. As shown in graph 170, there is a strong correlation between the amount of the increase of the fly height of the magnetic read/write head and the error rate of data written by the magnetic read/write head.

One approach for addressing the temporary fly height problem is the use of a bonded lubricant, which is a lubricant which tends to compress and stay in place under sufficient pressure. Since the bonded lubricant tends to stay in place, the thought is that the bonded lubricant will not flow and collect between the surface of the magnetic-recording disk and the magnetic read/write head (or the slider), thereby avoiding the problem. However, bonded lubricants are costly, and it is desirable to minimize the cost of materials used in the construction of hard-disk drives. Further, it may require an undesirable amount of time to determine which bonded lubricant is appropriate for use within a hard-disk drive, as it is undesirable to use a bonded lubricant which adversely interacts with other materials or introduces harmful airborne particles within the hard-disk drive. Also, bonded lubricants may not be as durable as free lubricants that can reflow into dry areas to prevent them from becoming damaged. Finally, the use of a bonded lubricant does not address temporary fly height problems caused by other types of fluids, such as condensation.

Another approach for addressing the temporary fly height problem is a modification to the design of the air bearing surface (ABS) of the magnetic read/write head, or another component of the HDD, to minimize the tendency of the ABS to collect and retain lubricant. However, such a modification would certainly require a significant amount of time and cost, and may not address temporary fly height problems caused by other types of fluids, such as condensation.

Yet another approach for addressing the temporary fly height problem may be performed by applying extra power to the thermal fly height control of a head each time the head is loaded onto the disk, and thereafter reducing the power to the thermal fly height control after a specified period of time. This approach has a risk of applying more power to the thermal fly height control of a head than is necessary, such as when no temporary fly height problem is present. Applying more power to the thermal fly height control of a head than is necessary is undesirable, as this may cause the head to fly too close to the surface of the disk to operate properly.

Having described certain issues posed by the temporary fly height problem and the challenges in overcoming them, a description of illustrative embodiments of the invention for overcoming the temporary fly height problem will now be presented.

Physical Description of Illustrative Embodiments of the Invention

Figure 2:
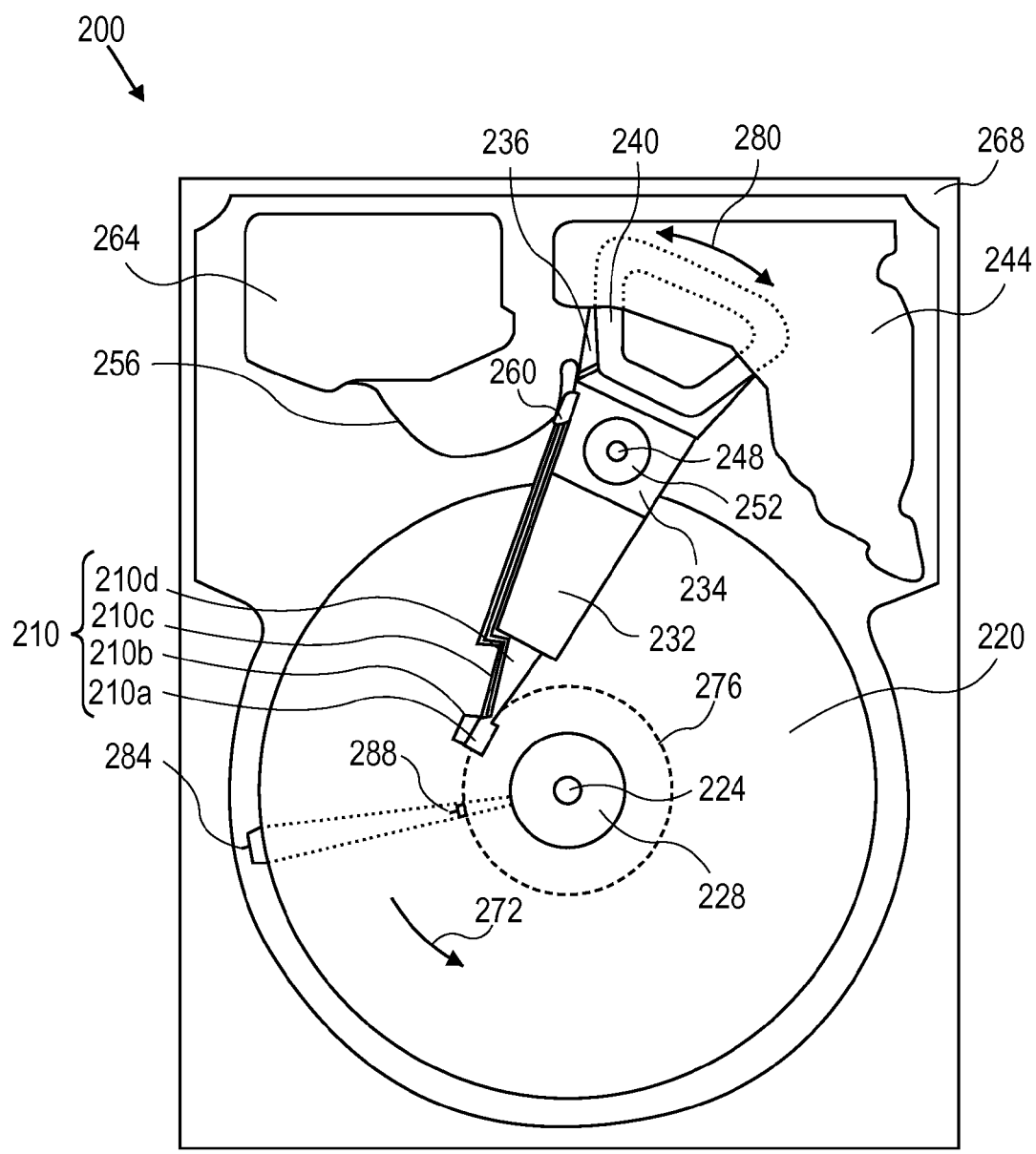
FIG. 2 is a plan view of an HDD according to an embodiment of the invention.

With reference to FIG. 2, in accordance with an embodiment of the invention, a plan view of a HDD 200 is shown. FIG. 2 illustrates the functional arrangement of components of the HDD including a slider 210b including a magnetic-recording head 210a. The HDD 200 includes at least one HGA 210 including the head 210a, a lead suspension 210c attached to the head 210a, and a load beam 210d attached to the slider 210b, which includes the head 210a at a distal end of the slider 210b; the slider 210b is attached at the distal end of the load beam 210d to a gimbal portion of the load beam 210d. The HDD 200 also includes at least one magnetic-recording disk 220 rotatably mounted on a spindle 224 and a drive motor (not shown) attached to the spindle 224 for rotating the disk 220. The head 210a includes a write element, a so-called writer, and a read element, a so-called reader, for respectively writing and reading information stored on the disk 220 of the HDD 200. The disk 220 or a plurality (not shown) of disks may be affixed to the spindle 224 with a disk clamp 228. The HDD 200 further includes an arm 232 attached to the HGA 210, a carriage 234, a voice-coil motor (VCM) that includes an armature 236 including a voice coil 240 attached to the carriage 234; and a stator 244 including a voice-coil magnet (not shown); the armature 236 of the VCM is attached to the carriage 234 and is configured to move the arm 232 and the HGA 210 to access portions of the disk 220 being mounted on a pivot-shaft 248 with an interposed pivot-bearing assembly 252.

With further reference to FIG. 2, in accordance with an embodiment of the invention, electrical signals, for example, current to the voice coil 240 of the VCM, write signal to and read signal from the read/write head (typically PMR) 210a, are provided by a flexible cable 256. Interconnection between the flexible cable 256 and the head 210a may be provided by an arm-electronics (AE) module 260, which may have an on-board pre-amplifier for the read signal, as well as other read-channel and write-channel electronic components. The flexible cable 256 is coupled to an electrical-connector block 264, which provides electrical communication through electrical feedthroughs (not shown) provided by an HDD housing 268. The HDD housing 268, also referred to as a casting, depending upon whether the HDD housing is cast, in conjunction with an HDD cover (not shown) provides a sealed, protective enclosure for the information storage components of the HDD 200.

With further reference to FIG. 2, in accordance with an embodiment of the invention, other electronic components (not shown), including a disk controller and servo electronics including a digital-signal processor (DSP), provide electrical signals to the drive motor, the voice coil 240 of the VCM and the head 210a of the HGA 210. The electrical signal provided to the drive motor enables the drive motor to spin providing a torque to the spindle 224 which is in turn transmitted to the disk 220 that is affixed to the spindle 224 by the disk clamp 228; as a result, the disk 220 spins in a direction 272. The spinning disk 220 creates a cushion of air that acts as an air-bearing on which the air-bearing surface (ABS) of the slider 210b rides so that the slider 210b flies above the surface of the disk 220 without making contact with a thin magnetic-recording medium of the disk 220 in which information is recorded. The electrical signal provided to the voice coil 240 of the VCM enables the head 210a of the HGA 210 to access a track 276 on which information is recorded. Thus, the armature 236 of the VCM swings through an arc 280 which enables the HGA 210 attached to the armature 236 by the arm 232 to access various tracks on the disk 220. Information is stored on the disk 220 in a plurality of concentric tracks (not shown) arranged in sectors on the disk 220, for example, sector 284. Correspondingly, each track is composed of a plurality of sectored track portions, for example, sectored track portion 288. Each sectored track portion 288 is composed of recorded data and a header containing a servo-burst-signal pattern, for example, an ABCD-servo-burst-signal pattern, information that identifies the track 276, and encoded location information. In accessing the track 276, the read element of the head 210a of the HGA 210 reads the servo-burst-signal pattern which provides a position-error-signal (PES) to the servo electronics, which controls the electrical signal provided to the voice coil 240 of the VCM, enabling the head 210a to follow the track 276. Upon finding the track 276 and identifying a particular sectored track portion 288, the head 210a either reads data from the track 276 or writes data to the track 276 depending on instructions received by the disk controller from an external agent, for example, a microprocessor of a computer system.

Embodiments of the invention also encompass HDD 200 that includes the HGA 210, the disk 220 rotatably mounted on the spindle 224, the arm 232 attached to the HGA 210 including the slider 210b including the head 210a.

Figure 3:
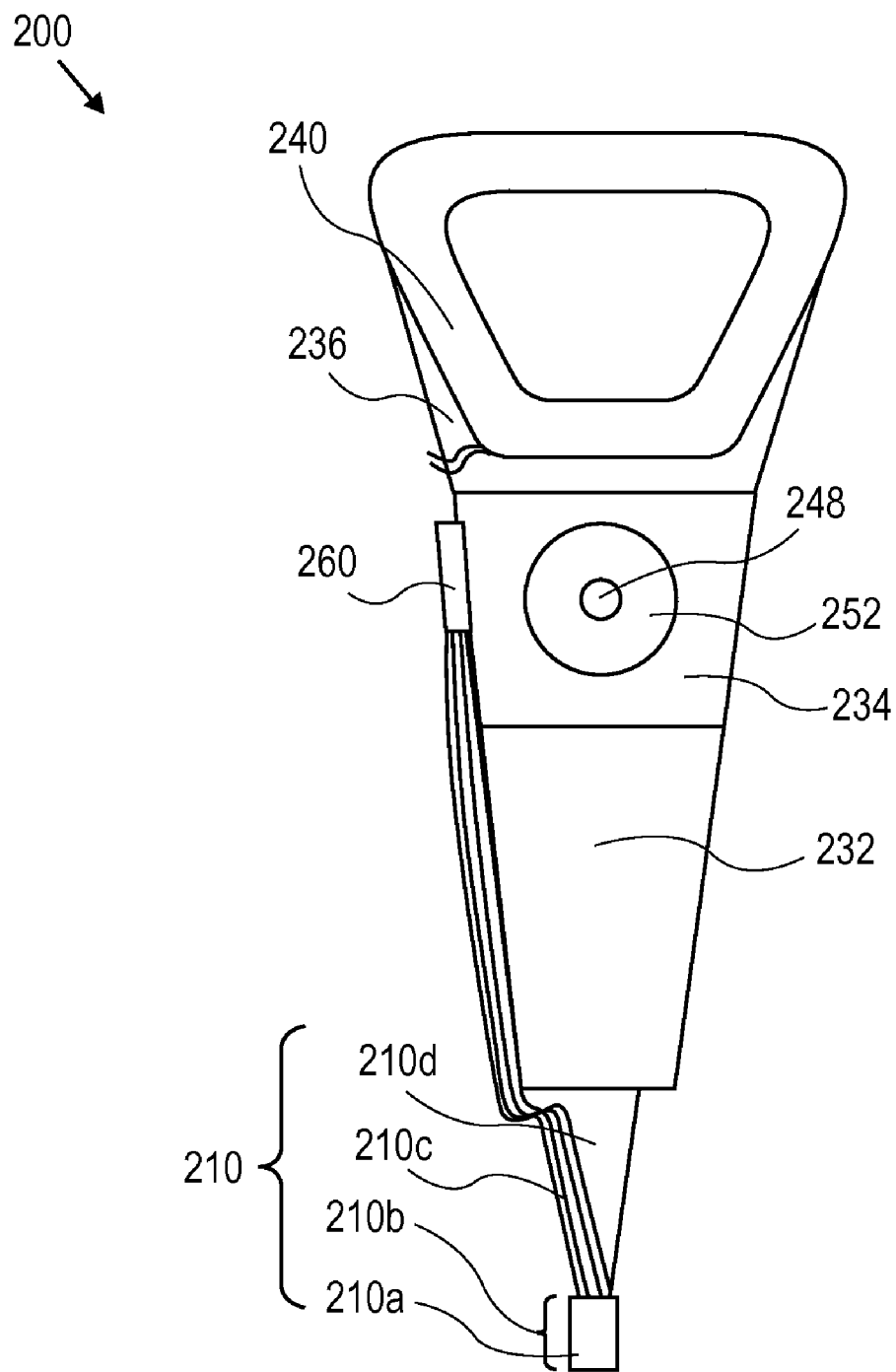
FIG. 3 is a plan view of a head-arm-assembly (HAA) according to an embodiment of the invention.

With reference now to FIG. 3, in accordance with an embodiment of the invention, a plan view of a head-arm-assembly (HAA) including the HGA 210 is shown. FIG. 2 illustrates the functional arrangement of the HAA with respect to the HGA 210. The HAA includes the arm 232 and HGA 210 including the slider 210b including the head 210a. The HAA is attached at the arm 232 to the carriage 234. In the case of an HDD having multiple disks, or platters as disks are sometimes referred to in the art, the carriage 234 is called an "E-block," or comb, because the carriage is arranged to carry a ganged array of arms that gives it the appearance of a comb. As shown in FIG. 3, the armature 236 of the VCM is attached to the carriage 234 and the voice coil 240 is attached to the armature 236. The AE 260 may be attached to the carriage 234 as shown. The carriage 234 is mounted on the pivot-shaft 248 with the interposed pivot-bearing assembly 252.

Embodiments of the invention may include one or more electrical components configured to (a) determine whether it is likely that a fluid is interposed between the surface of the magnetic-recording disk 220 and the air-bearing surface of slider 210b and/or head 210a, and (b) temporarily adjust one or more of (i) a thermal fly height control setting of head 210a and (ii) a write parameter of head 210a to compensate for head 210a flying higher than normal as a result of the fluid being interposed between the surface of magnetic-recording disk 220 and the air-bearing surface of slider 210b. Such one or more electrical components may be, but need not be, implemented in arm-electronics (AE) module 260.

Having described the physical description of an illustrative embodiment of the invention, discussion will now be presented describing how embodiments of the invention may be used to improve the quality of write operations performed by read/write heads that are experiencing the temporary fly height problem.

Figure 4:
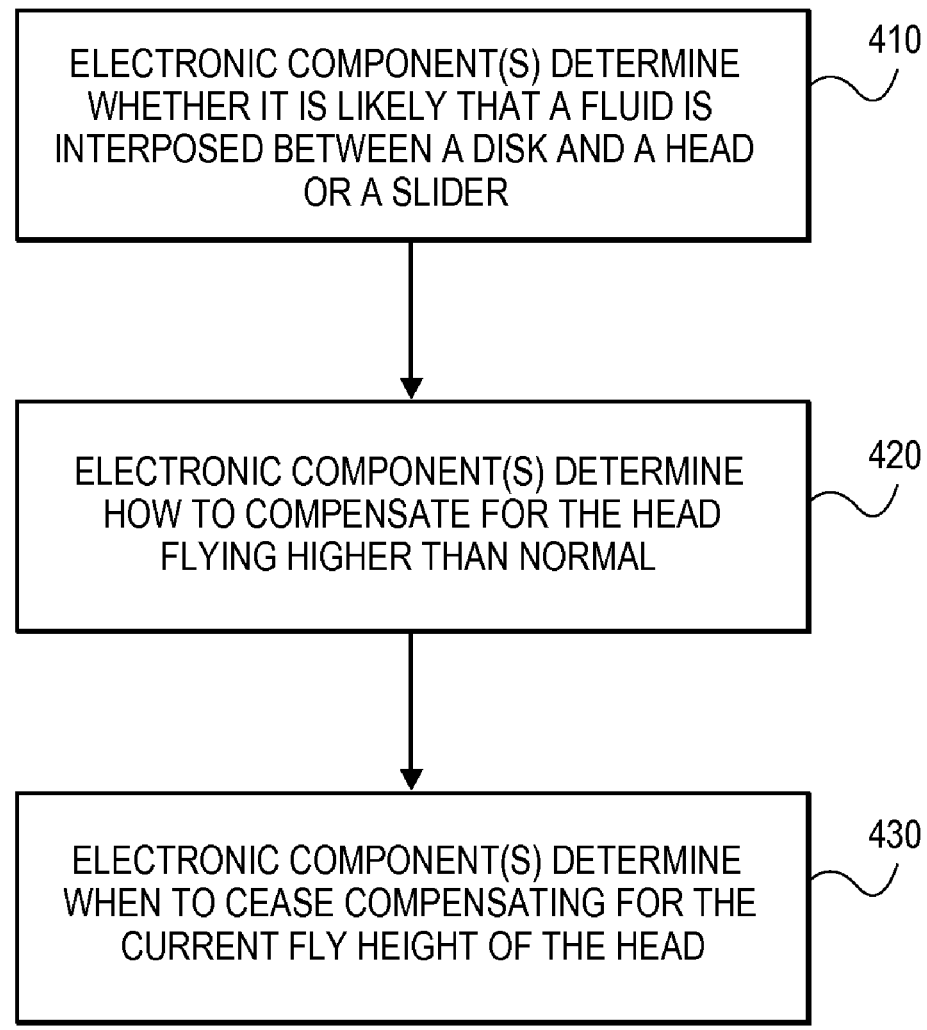
FIG. 4 is a flowchart illustrating the high level functional steps of improving the write quality of an idle HDD head according to an embodiment of the invention.

Overview of Improving the Write Quality of a HDD Head Experiencing Temporary Fly-Height Problem FIG. 4 is a flowchart illustrating the high level functional steps of improving the write quality of a read/write head that is experiencing temporary fly height problem according to an embodiment of the invention. Each step illustrated in FIG. 4 may be performed by one or more electronic components residing in HDD 200, and optionally implemented as part of arm-electronics (AE) module 260. By performing the steps of FIG. 4, HDD 200 may perform write operations to disk 220 with greater accuracy and improved quality, despite head 210a occasionally experiencing the temporary fly height problem.

In step 410, one or more electronic components determine whether it is likely that a fluid is interposed between the surface of magnetic-recording disk 220 and the air-bearing surface of head 210a or slider 210b. In effect, the purpose of step 410 is to determine when the one or more electronic components should begin making some sort of adjustment to compensate for head 210a flying higher than normal as a result of fluid being interposed between the surface of magnetic-recording disk 220 and the air-bearing surface of head 210a or slider 210b.

In step 420, one or more electronic components determine how to compensate for head 210a flying higher than normal. Step 420 may be performed by determining how to temporarily adjust one or more of (a) a thermal fly height control setting of head 210a or (b) a write parameter of head 210a. The particular decision on whether to adjust either the thermal control setting of head 210a or a write parameter of head 210a (or both) is an implementation decision, as embodiments may adjust any combination of the thermal control setting of head 210a or a write parameter of head 210a to achieve a desired result.

By changing the amount of power supplied to the thermal fly height control setting of head 210a, the fly height of head 210a may be adjusted. By increasing the amount of power supplied to thermal fly height control setting of head 210a, a heating element associated with the thermal fly height control setting of head 210a increases in temperature, and consequently expands, thereby moving head 210a closer to the disk surface 220. In this way, if head 210a is flying higher than normal due to the temporary presence of fluid interposed between disk 220 and head 210a or slider 210b, the flying height of head 210a may be adjusted downwards so that head 210a flies over disk 210b at the normal or desired height.

In addition to or instead of making an adjustment to the thermal fly height control setting of head 210a, a temporary increase in the fly height of head 210a may be compensated by making an adjustment to a write parameter of head 210a. A write parameter of head 210a refers to any parameter or variable which may be adjusted or configured to cause a change in the magnetic field produced by head 210a. In this way, the properties of the magnetic field produced by head 210a may be adjusted so that head 210a writes data correctly at the higher flying height at which it is temporary located due to the presence of the fluid interposed between disk 220 and head 210a or slider 210b. Non-limiting, illustrative write parameters include the write current, the write kick, and any variables adjustable by arm-electronics module 260, such as variables pertaining to the preamplifier.

While embodiments of the invention shall chiefly be described as performing step 420 by making an adjustment to either the thermal fly height control setting or a write parameter of head 210a, those skilled in the art shall appreciate that other approaches for compensating head 210a for flying higher than normal may be employed. Thus, embodiments of the invention may employ any approach for reducing the number of errors in data written by a head temporarily flying higher than normal in the performance of step 420.

In step 430, one or more electronic components determine when to cease compensating for the current fly height of head 210a. When the fluid interposed between head 210a or slider 210b and disk 220 is dispersed by the rotation of disk 220, the fluid will cease causing head 210a to fly higher than normal over disk 220. At that time, the one or more components should stop compensating for head 210a flying higher than normal by ceasing to perform the adjustment performed by the one or more components in step 420.

By performing the steps of FIG. 4, adjustments may be temporarily made to the current fly height of head 210a without the need for head 210a to touch down upon the surface of disk 220 for purposes of recalibrating the fly height of head 210a. This is advantageous, as anytime head 210a makes physical contact with disk 220 there is a chance that either head 210a or disk 220 could be damaged.

One or more electrical components may perform each of steps 410, 420, and 430 using a variety of different approaches. Several illustrative approaches for performing each of steps 410, 420, and 430 are described below in greater detail.

Figure 5:
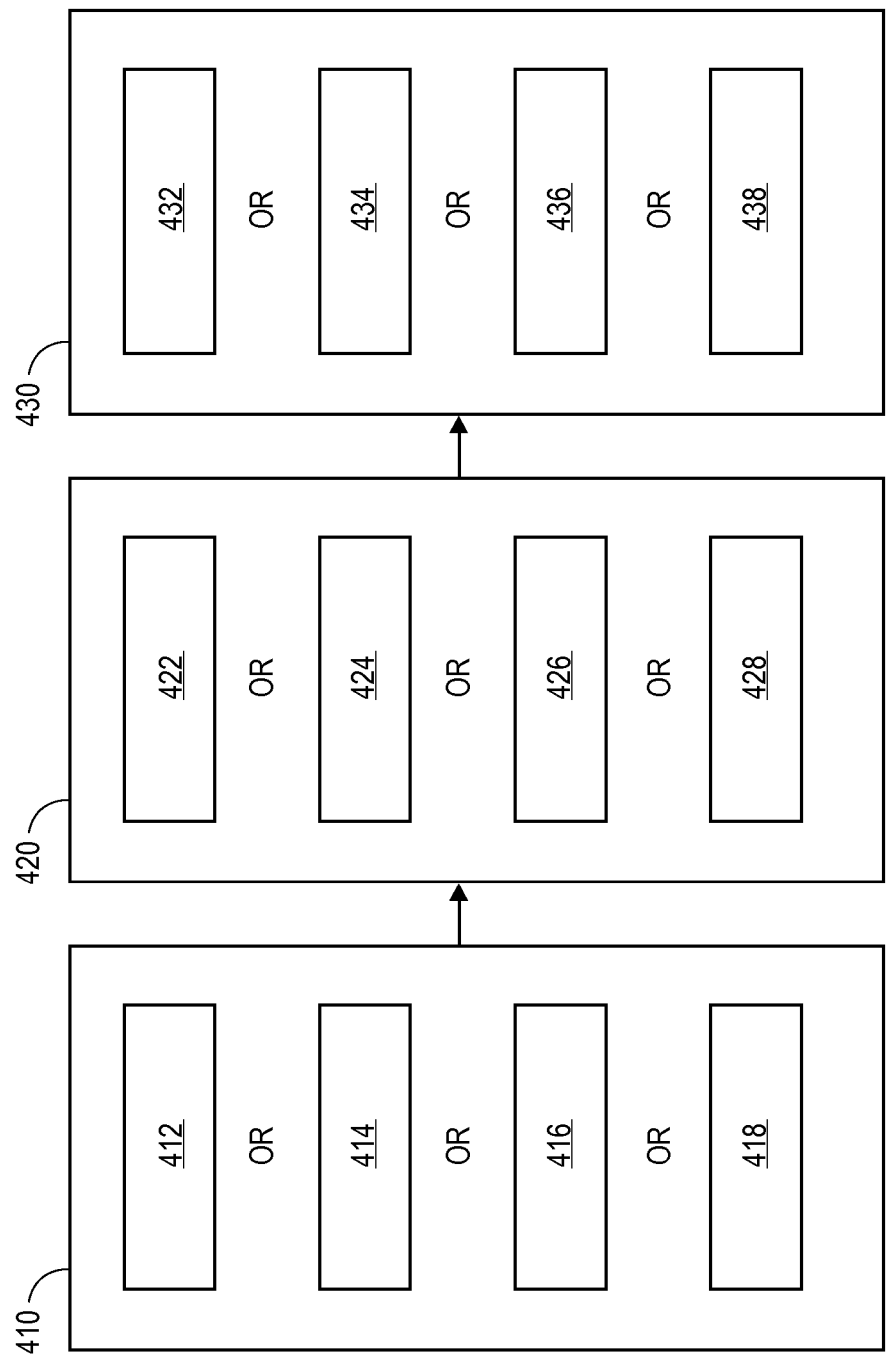
FIG. 5 is a flowchart illustrating various approaches performing the steps of FIG. 4 according to embodiments of the invention.

Approaches for Determining when a Head is Experiencing the Temporary Fly Height Problem FIG. 5 is a flowchart illustrating various approaches for performing the steps of FIG. 4 according to various embodiments of the invention. FIG. 5 depicts multiple approaches for performing each of steps 410, 420, and 430.

In step 410 of FIG. 4, one or more electronic components determine whether it is likely that a fluid is interposed between the surface of magnetic-recording disk 220 and the air-bearing surface of head 210a or slider 210b. Embodiments of the invention may perform step 410 by performing one of steps 412, 414, 416, and 418 as shown in FIG. 5. Each of steps 412, 414, 416, and 418 shall be discussed in detail below.

In step 412, the one or more electronic components determine that it is likely that the fluid is interposed between the air bearing surface of disk 220 and head 210a or slider 210b when an amount of time has passed since either (a) HDD 200 has entered a power save mode or (b) head 210a has been idle. When HDD 200 enters a power save mode, head 210a may be parked on a ramp and become idle. When head 210a is parked on a ramp or is idle, after a certain amount of time, lubricant may flow towards head 210a and collect underneath an exposed portion of slider 210b. Thus, the one or more electronic components may determine that if head 210a has been idle and/or parked on a ramp for an amount of time that allows lubricant to collect underneath slider 210b and/or head 210a, then the one or more electronic components will determine that it is likely that a fluid is interposed between the surface of magnetic-recording disk 220 and an air-bearing surface of head 210a and/or slider 210b in step 410.

The amount of time (referred to as the "idle period") which needs to pass since either (a) HDD 200 has entered a power save mode or (b) head 210a has been idle before the one or more electronic components determines it is likely that fluid is interposed between the surface of disk 220 and head 210a or slider 210b may vary, as it may be based on the nature or characteristics (such as viscosity or responsiveness to temperature) of the particular lubricant employed by HDD 200. An exemplary idle period for an embodiment is one hour.

In step 414, the one or more electronic components may base their determination of whether it is likely that a fluid is interposed between disk 220 and head 210a or slider 210b upon data describing characteristics of head 210a obtained during, or contemporaneous with, the manufacture of HDD 200. In this way, the one or more electronic components may only compensate certain heads that are particularly susceptible to the temporary fly height problem. Screens or tests may be performed during or contemporaneous with the manufacturing process to identify those heads which are particularly susceptible to the temporary fly height problem.

In step 416, the one or more electronic components may base their determination of whether it is likely that a fluid is interposed between disk 220 and head 210a or slider 210b upon characteristics (such as amplitude) of a signal generated by head 210a. Step 416 may be performed when head 210a loads onto disk 220.

In step 418, the one or more electronic components may base their determination of whether it is likely that a fluid is interposed between disk 220 and head 210a or slider 210b upon an error rate of data written by head 210a. In this approach, head 210a writes data to disk 220. Thereafter, head 210a verifies that the data written to disk 220 may be read properly. The quality of the write may be assessed on a variety of different metrics, such as raw symbol error rate or an error recovery procedure (ERP) step. If head 210a is unable to write data properly to disk 220, then the one or more electronic components may determine that head 210a is experiencing the temporary fly height problem.

Certain embodiments of the invention may perform step 410 by performing two or more of steps 412, 414, 416, and 418. Such embodiments may, but need not, give greater weight to one of steps 412, 414, 416, and 418 over the others in determining how to perform step 410.

While several approaches depicted in FIG. 5 for performing step 410 have been discussed above, these approaches are illustrative and are not meant to enumerate all the approaches for performing step 410 which may be performed by embodiments of the invention. For example, in other embodiments of the invention not depicted in FIG. 5, step 410 may be performed by measuring the current fly height of head 210a using techniques known to those in the art. In such an approach, if the current fly height of 210a is higher than normal or desired, then embodiments of the invention may conclude that head 210a is experiencing the temporary fly height problem, and may consequently perform steps 420 and 430 to compensate.

Approaches for Determining how to Compensate for the Temporary Fly Height Problem In step 420, one or more electronic components determine how to compensate for head 210a temporarily flying higher than normal. Embodiments of the invention may perform step 420 by performing one of steps 422, 424, 426, and 428 as shown in FIG. 5. Each of steps 422, 424, 426, and 428 shall be discussed in detail below. Determining the amount of the adjustment to make to the thermal fly height control setting or a write parameter of head 210a is important because it is undesirable to overcompensate for the temporary fly height control problem, which may cause head 210a to fly too close to disk 220 or otherwise fail to write data to disk 220 with an unacceptable number of errors.

In step 422, the one or more electronic components temporarily adjust either the thermal fly height control setting or a write parameter of head 210a by a fixed amount based upon characteristics of the fluid which is anticipated to be causing the temporary fly height problem. While the approach of step 422 is quick and simple, it may not be quite as effective in all situations as other approaches for performing step 420. For example, step 422 may be performed by supplying an additional 20 mW of power to the thermal fly height control setting of head 210a to cause head 210 to fly closer to the surface of disk 220. Note that in this example, 20 mW is a best guess of what adjustment to make based on characteristics of the lubricant used in HDD 200; consequently, increasing the power to the thermal fly height control setting of head 210a by 20 mW may be appropriate in most, but not all, situations in which head 210a experiences the temporary fly height control problem.

In step 424, the one or more electronic components temporarily adjust a thermal fly height control setting or a write parameter of head 210a by an amount based on characteristics of head 210a determined during, or contemporaneous with, the manufacture of HDD 200 or head 210a. The characteristics of head 210a may be based on manufacturing specifications or tests performing during or contemporaneous with the manufacturing process. Illustrative, non-limiting examples of the characteristics of head 210a which may be considered in step 424 include the soft error rate sensitivity of the head to changes in the thermal fly height control settings.

In step 426, the one or more electronic components temporarily adjust the thermal fly height control setting or a write parameter of head 210a by an amount based on a current set of characteristics of a magnetic signal generated by head 210a. Thus, the amount of the adjustment to make may be based on the soft error rate or a measure of the signal amplitude. For example, if the amplitude of the signal is small, then embodiments of the invention may apply more power to the thermal fly height control settings, whereas if the amplitude of the signal is large, then embodiments of the invention may apply less power to the thermal fly height control settings.

In step 428, the one or more electronic components temporarily adjust the thermal fly height control setting or a write parameter of head 210a by an amount based on an error rate of data written by head 210a. To illustrate, an initial amount to adjust either the thermal fly height control settings or a write parameter of head 210a may be determined based on the current error rate of data written by head 210a. After an adjustment to either or both of the thermal fly height control settings or a write parameter of head 210a is made, then one or more electrical components may monitor the impact of the adjustment(s) to the error rate of data written by head 210a, and may thereafter may make any further adjustments deemed necessary. In this way, the one or more electronic components may (a) revert back to a prior configuration setting if a problem is caused by a newer configuration setting, and (b) continue to make adjustments until a desired error rate of data written by head 210a is obtained.

Certain embodiments of the invention may perform step 420 by performing two or more of steps 422, 424, 426, and 428. Such embodiments may, but need not, give greater weight to one of steps 422, 424, 426, and 428 over the others in determining how to perform step 420.

While several approaches depicted in FIG. 5 for performing step 420 have been discussed above, these approaches are illustrative and are not meant to enumerate all the approaches for performing step 420 which may be performed by embodiments of the invention. For example, in other embodiments of the invention not depicted in FIG. 5, step 420 may be performed by measuring the current fly height of head 210a using techniques known to those in the art. In such an approach, the amount of power to supply to the thermal fly height control settings of head 210a or the amount of adjustment to a write parameter is based on the current fly height of head 210a.

Approaches for Determining when to Cease Compensating for the Temporary Fly Height Problem In step 430, one or more electronic components determine when to cease compensating for the current fly height of head 210a. Embodiments of the invention may perform step 430 by performing one of steps 432, 434, 436, and 438 as shown in FIG. 5. Each of steps 432, 434, 436, and 438 shall be discussed in detail below.

In step 432, the one or more electronic components are configured to cease adjusting one or more of the thermal fly height control setting and a write parameter of head 210a after a fixed or configurable amount of time has passed since the one or more electronic components began to adjust one or more of the thermal fly height control setting and the write parameter of head 210a. For example, in an embodiment, the one or more electronic components may be configured to cease any adjustment made to a head to compensate for the temporary fly height problem after twenty minutes. The length of time to make an adjustment to one or more of thermal fly height control setting and a write parameter of head 210a before ceasing to make the adjustment may be based on an expected amount of time necessary for the temporary fly height control problem to correct itself, which may be determined through experimentation.

In step 434, the one or more electronic components are configured to cease adjusting one or more of the thermal fly height control setting and the write parameter of head 210a based on a current temperature of the interior of HDD 200. As the speed in which a lubricant flows tends to decrease as the lubricant decreases in temperature, the amount of time to compensate for the temporary fly height control problem may be based on the internal temperature of HDD 200, which will affect how fast fluids therein will flow. Thus, the amount of time the typical temporary fly height control problem affects a head will change based on the internal temperature of HDD 200.

In step 436, the one or more electronic components are configured to cease adjusting one or more of the thermal fly height control setting and the write parameter of head 210a based on a current set of characteristics of a signal generated by head 210a. In such an approach, parametric data may be measured at various intervals, which may be subsequently used as a basis for determining when the adjustments made to compensate for the temporary fly height control problem may be reduced or stopped.

In step 438, the one or more electronic components are configured to cease adjusting one or more of the thermal fly height control setting and the write parameter of head 210a based on an error rate of data written by head 210a. The error rate of data written by head 210a may be checked after a specified number of write operations are performed by head 210a. After an adjustment to either or both of the thermal fly height control settings or a write parameter of head 210a is made, then one or more electrical components may monitor the impact of the adjustment(s) to the error rate of data written by head 210a, and may thereafter make any further adjustments deemed necessary, such as reducing the amount of adjustments made to compensate for the temporary fly height problem. In this way, the one or more electronic components may slowly reduce the adjustments made to compensate for the temporarily fly height problem, and continue to make adjustments until no further adjustments are required to compensate for the temporary fly height control problem.

Certain embodiments of the invention may perform step 430 by performing two or more of steps 432, 434, 436, and 438. Such embodiments may, but need not, give greater weight to one of steps 432, 434, 436, and 438 over the others in determining how to perform step 430.

While several approaches depicted in FIG. 5 for performing step 430 have been discussed above, these approaches are illustrative and are not meant to enumerate all the approaches for performing step 430 which may be performed by embodiments of the invention. For example, in other embodiments of the invention not depicted in FIG. 5, step 430 may be performed by measuring the current fly height of head 210a using techniques known to those in the art. In such an approach, once head 210a is flying at the normal or desired height over disk 220, then no further adjustments to head 210a are made to compensate for the temporary fly height control problem.

Implementation Considerations

Various approaches for performing each of the steps of FIG. 4 have been discussed herein. Each of the approaches discussed herein for performing a particular step of FIG. 4 may have certain advantages or disadvantages over other approaches for performing the same step of FIG. 4. For example, different approaches for performing one of the steps of FIG. 4 may have different tradeoffs in effectiveness and complexity. While steps 412, 422, and 432 are relatively simple to implement and computationally fast to execute, they may be less accurate than steps such as 416, 418, 426, 428, 436, and 438. Thus, the particular approach selected to implement the steps of FIG. 4 should be suitable for the situation and environment in which it will be deployed. When time is not a limiting factor, a longer or more complex approach may be appropriate, e.g., when disk 220 of HDD 200 begins to rotate. Since there is more time before head 210a begins to operate relative to when disk 220 is already spinning, an embodiment may perform a more time intensive approach (such as steps 416, 418, 426, 428, 436, or 438). In considering which approach to employ in performing a step of FIG. 4, one should attempt to minimize or eliminate the amount of errors in the data written by head 210a due to excessive or insufficient spacing, eliminate or reduce command timeouts, and avoid any significant degradation to the performance of HDD 200.

While embodiments of the invention have been chiefly described as addressing the temporary fly height problem, other embodiments of the invention may be used to compensate for temporary problems with the fly height of a head caused by reasons other than the temporary fly height problem. In such an embodiment, step 410 would be directed towards determining the likelihood of head 210a having an incorrect fly height, step 420 would be directed towards determining the amount of adjustment to head 210a to compensate for the problem causing the incorrect fly height, and step 430 would be directed towards determining when to stop making an adjustment to head 210a.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A hard-disk drive comprising:
a magnetic read/write head attached to a slider;
a magnetic-recording disk rotatably mounted on a spindle;
a drive motor having a motor shaft attached to the spindle for rotating the magnetic-recording disk;
a voice-coil motor configured to move the magnetic read/write head to access portions of the magnetic-recording disk; and
one or more electronic components configured to (a) determine whether it is likely that a fluid is interposed between a surface of the magnetic-recording disk and the magnetic read/write head or the slider, and (b) temporarily adjust a write parameter of the magnetic read/write head to compensate for the magnetic-read/write head flying higher than normal as a result of the fluid being interposed between the surface and the magnetic read/write head or the slider.

2. The hard-disk drive of claim 1, wherein the amount of time that the one or more electronic components temporarily adjust the write parameter is based on how much time is needed for the fluid to cease causing the magnetic read/write head to fly higher than normal.

3. The hard-disk drive of claim 1, wherein the fluid is a lubricant.

4. The hard-disk drive of claim 1, wherein the fluid is a result of condensation of vapor present within the interior of the hard-disk drive.

5. The hard-disk drive of claim 1, wherein the one or more electronic components determine that it is likely that the fluid is interposed between the surface of the magnetic-recording disk and the magnetic read/write head or the slider when an amount of time has passed since either (a) the hard-disk drive has entered a power save mode or (b) the magnetic read/write head has been idle.

6. The hard-disk drive of claim 1, wherein the determination of whether it is likely that the fluid is interposed between the surface of the magnetic-recording disk and the magnetic read/write head or the slider is based upon data describing characteristics of the magnetic read/write head obtained during, or contemporaneous with, the manufacture of the hard-disk drive.

7. The hard-disk drive of claim 1, wherein the determination of whether it is likely that the fluid is interposed between the surface of the magnetic-recording disk and the magnetic read/write head or the slider is based upon characteristics of a signal generated by the magnetic read/write head.

8. The hard-disk drive of claim 7, wherein the characteristics of the signal includes the amplitude of the signal.

9. The hard-disk drive of claim 1, wherein the determination of whether it is likely that the fluid is interposed between the surface of the magnetic-recording disk and the magnetic read/write head or the slider is based upon an error rate of data written by the magnetic read/write head.

10. The hard-disk drive of claim 1, wherein the one or more electronic components temporarily adjust the write parameter by a fixed amount based upon characteristics of the fluid.

11. The hard-disk drive of claim 1, wherein the one or more electronic components temporarily adjust the write parameter of the magnetic read/write head by an amount based on characteristics of the magnetic read/write head determined during, or contemporaneous with, the manufacture of the hard-disk drive.

12. The hard-disk drive of claim 1, wherein the one or more electronic components temporarily adjust the write parameter of the magnetic read/write head by an amount based on a current set of characteristics of a magnetic write signal generated by the magnetic read/write head.

13. The hard-disk drive of claim 1, wherein the one or more electronic components temporarily adjust the write parameter of the magnetic read/write head by an amount based on an error rate of data written by the magnetic read/write head.

14. The hard-disk drive of claim 1, wherein the one or more electronic components are configured to cease adjusting the write parameter after an amount of time has passed since the one or more electronic components began to temporarily adjust one or more of the thermal fly height control setting and the write parameter of the magnetic read/write head.

15. The hard-disk drive of claim 1, wherein the one or more electronic components are configured to cease adjusting the write parameter based on a current temperature of the interior of the hard-disk drive.

16. The hard-disk drive of claim 1, wherein the one or more electronic components are configured to cease adjusting the write parameter based on a current set of characteristics of a signal generated by the magnetic read/write head.

17. The hard-disk drive of claim 1, wherein the one or more electronic components are configured to cease adjusting the write parameter based on an error rate of data written by the magnetic read/write head.

18. The hard-disk drive of claim 17, wherein the error rate of data written by the magnetic read/write head is checked after a specified number of write operations are performed by the magnetic read/write head.

19. An apparatus for use within a hard-disk drive, comprising:
one or more electronic components configured to (a) determine whether it is likely that a fluid is interposed between a surface of a magnetic-recording disk and a magnetic read/write head or a slider, and (b) temporarily adjust a write parameter of the magnetic read/write head to compensate for the magnetic-read/write head flying higher than normal as a result of the fluid being interposed between the disk surface and the read/write head or the slider.

* * * * *